United States Patent
Rosenfeld et al.

(10) Patent No.: US 12,182,668 B2
(45) Date of Patent: Dec. 31, 2024

(54) METHOD AND SYSTEM TO CLASSIFY SENSOR DATA WITH IMPROVED TRAINING ROBUSTNESS

(71) Applicants: Robert Bosch GmbH, Stuttgart (DE); Carnegie Mellon University, Pittsburgh, PA (US)

(72) Inventors: Elan Kennar Rosenfeld, Pittsburgh, PA (US); Ezra Maurice Winston, Pittsburgh, PA (US); Frank Schmidt, Leonberg (DE); Jeremy Zieg Kolter, Pittsburgh, PA (US)

(73) Assignees: ROBERT BOSCH GMBH, Stuttgart (DE); CARNEGIE MELLON UNIVERSITY, Pittsburgh, PA (US)

(*) Notice: Subject to any disclaimer, the term of this patent is extended or adjusted under 35 U.S.C. 154(b) by 1140 days.

(21) Appl. No.: 17/025,076

(22) Filed: Sep. 18, 2020

(65) Prior Publication Data
US 2021/0089842 A1    Mar. 25, 2021

(30) Foreign Application Priority Data
Sep. 24, 2019  (EP) .................................. 19199297

(51) Int. Cl.
*G06N 20/00*    (2019.01)
*G06F 18/214*   (2023.01)
(Continued)

(52) U.S. Cl.
CPC ........... *G06N 20/00* (2019.01); *G06F 18/214* (2023.01); *G06F 18/2415* (2023.01); *G06F 18/2431* (2023.01); *G06N 3/088* (2013.01)

(58) Field of Classification Search
CPC ...... G06N 20/00; G06N 3/088; G06F 18/214; G06F 18/2415; G06F 18/2431
See application file for complete search history.

(56) References Cited

U.S. PATENT DOCUMENTS

| | | |
|---|---|---|
| 2017/0068888 A1 | 3/2017 | Chung et al. |
| 2017/0220951 A1 | 8/2017 | Chidlovskii et al. |

(Continued)

FOREIGN PATENT DOCUMENTS

| | | |
|---|---|---|
| CN | 107463951 A | 12/2017 |
| CN | 107463953 A | 12/2017 |

(Continued)

OTHER PUBLICATIONS

Yam et al., "A new method in determining initial weights of feedforward neural networks for training enhancement," Neurocomputing 16 (1997) 23-32 (Year: 1997).*

(Continued)

*Primary Examiner* — Miranda M Huang
*Assistant Examiner* — Yao David Huang
(74) *Attorney, Agent, or Firm* — NORTON ROSE FULBRIGHT US LLP; Gerard A. Messina

(57) ABSTRACT

A method to classify sensor data with improved robustness against label noise. A predicted label may be computed for a novel input with improved robustness against label noise by estimating a label which is most likely under repeated application of a base training function to the training labels (Continued)

incorporating noise according to a noise level and subsequent application of a base classifier configured according to the base prediction function to the novel input.

16 Claims, 5 Drawing Sheets

(51) Int. Cl.
*G06F 18/2415* (2023.01)
*G06F 18/2431* (2023.01)
*G06N 3/088* (2023.01)

(56) References Cited

U.S. PATENT DOCUMENTS

| | | | |
|---|---|---|---|
| 2018/0024968 A1 | | 1/2018 | Clinchant et al. |
| 2018/0137417 A1* | | 5/2018 | Theodorakopoulos .. G06N 3/04 |
| 2018/0150728 A1* | | 5/2018 | Vahdat .................. G06N 3/045 |
| 2018/0349605 A1 | | 12/2018 | Wiebe et al. |
| 2020/0125112 A1* | | 4/2020 | Mao ....................... G06F 18/217 |

FOREIGN PATENT DOCUMENTS

| | | |
|---|---|---|
| CN | 108446700 A | 8/2018 |
| CN | 108520202 A | 9/2018 |
| CN | 109639710 A | 4/2019 |
| CN | 109741736 A | 5/2019 |
| WO | 2018046412 A1 | 3/2018 |

OTHER PUBLICATIONS

Meza, Juan C., "Newton's Method," (2010), retrieved from <https://escholarship.org/uc/item/4nk3w9dw> (Year: 2010).*
Cogill et al., "A Chernoff Bound Approximation for Risk-Averse Integer Programming," 2011 American Control Conference on O'Farrell Street, San Francisco, CA, USA Jun. 29-Jul. 1, 2011 (Year: 2011).*
Natarajan et al., "Learning with Noisy Labels," Advances in Neural Information Processing Systems 26 (NIPS 2013) (Year: 2013).*
Jindal et al., "Learning Deep Networks from Noisy Labels with Dropout Regularization," 2016 IEEE 16th International Conference on Data Mining (Year: 2016).*
Lecuyer et al., "Certified Robustness to Adversarial Examples with Differential Privacy," arXiv:1802.03471v4 [stat.ML] May 29, 2019 (Year: 2019).*
Hadi Salman et al., "Provably Robust Deep Learning via Adversarially Trained Smoothed Classifiers," Cornell University, 33rd Conference on Neural Information Processing Systems (NeurIPS 2019), Vancouver, Canada, arXiv:1906.04584v3 [cs.LG] Sep. 14, 2019.
Jeremy M Cohen et al., "Certified Adversarial Robustness via Randomized Smoothing," Cornell University, Proceedings of the 36th International Conference on Machine Learning, Long Beach, California, PMLR 97, 2019, arXiv:1902.02918v2 [cs.LG] Jun. 15, 2019.

* cited by examiner

METHOD AND SYSTEM TO CLASSIFY SENSOR DATA WITH IMPROVED TRAINING ROBUSTNESS

CROSS REFERENCE

The present application claims the benefit under 35 U.S.C. § 119 of European Patent Application No. EP 19199297.3 filed on Sep. 24, 2019, which is expressly incorporated herein by reference in its entirety.

FIELD

The present invention relates to a computer implemented method to classify sensor data with improved robustness against label noise, a classifying system configured to classify sensor data with improved robustness against label noise, and a transitory or non-transitory computer readable medium.

BACKGROUND INFORMATION

Deep neural networks, despite their widespread empirical success, are known to be susceptible to adversarial attacks. Research in this topic has focused on so-called "test-time attacks", also known as exploratory attacks, where an attacker adversarially manipulates inputs to a classifier at inference time to cause the example to be misclassified. Data-poisoning attacks—where the attacker manipulates some aspects of the training data in order to cause the learning algorithm to output a faulty classifier—are also known to be a problem. For example, one may consider so-called label-flipping attacks, where the labels of a training set are adversarially manipulated to decrease performance of the trained classifier. For example, one may try to manipulate the training set so that specific input patterns trigger certain classifications at test time. However, unlike the test-time adversarial setting, where reasonably effective defenses exists to build adversarially robust deep neural networks, relatively little work has been done on building deep classifiers that are robust to data poisoning attacks.

The performance of any machine learning approach in the end depends on a dataset on which it was trained. It is common to collect huge amounts of data in order to improve the quality of a machine learning approach, e.g., classification or regression. If data is corrupted in part, this may lead to a bad machine learned device. The corruption may be adversarial. For example, an attacker may purposefully change parts of the dataset in order to corrupt the final trained product. However, corruption may also happen without bad intent. For example, a sensor at some data source may be faulty. The fault may even be intermittent.

To avoid working from corrupted data, one could adopt a sanitation approach. For example, one may remove those samples that violate a statistical assumption about the data. Nonetheless, it is not enough, especially in case of an adversarial attack.

SUMMARY

In accordance with It would be advantageous to have an improved method to classify sensor data with improved robustness against label noise, e.g., corrupted training data. The label noise may comprise adversarial label noise, e.g., labels that were intentionally changed with a view to change the behavior of a classifier device that is trained on the corrupted training data. The label noise may comprise non-adversarial label noise, e.g., caused by measurement problems, e.g., caused by a faulty sensor.

Computer implemented methods to classify sensor data are described herein.

For example, a classification method may predict a label for a novel input data based on training data in which multiple training input data are associated with a similar label. The training data may be corrupted. The prediction is made according to a base classifier, e.g., a prediction function which may be trained at least in part on the training data. Interestingly, the base classifier may comprise two parts: an encoder and a classifier.

The encoder may be configured to map an input data to a latent representation while the classifier may be configured to be applied to the latent representation. Both the encoder and the classifier may be defined by parameters. Training the base classifier may comprise optimizing the parameters so that the base classifier fits the training data. Interestingly, in an embodiment, the encoder part of the base classifier may be regarded as fixed, while the classifier part may be re-trained.

For example, a base training function may be configured for optimizing the parameters defining the classifier according to the training data, while leaving the parameters of the encoder untouched. Training only the classifier can be done faster than training the combination of encoder and classifier; the combination has more parameters than its parts.

A novel input data may be provided. Typically, the novel input data is not represented in the training data. However, this is not needed, as it may be suspected that the label assigned to the novel input data is corrupted.

A label for the novel input with improved robustness against label noise could be computed by repeatedly 1) training the base classifier on the training data but with label-noise added and 2) predicting a classification according to the trained base classifier. From the repeated predictions the improved prediction may be determined by determining which label occurs most frequently. The training under 1) can be performed efficiently because the base classifier has two parts. Only the classifier part needs to be trained under 1), the encoder part may remain fixed.

The approach may be used with different levels of noise, e.g., determined by the amount of expected corruption in the labels. For example, a noise level may be determined which flips a label with a certain probability. For example, with a probability of 10% or the like a label may be flipped to add label noise. Flipping a label means assigning a different value to the label. In case the label is a binary label, it means assign the opposite value. For example, if a label is a 1 or 0 bit b, then the flipped bit b might be 1−b.

Binary labels work well in many embodiments. But it is not needed, for example, a label may also carry some information in its magnitude. For example, a ranged label may have a value within an interval, e.g., the interval [0-1], or [0-2], etc. For example, a positive danger label may indicate a danger classification in the sensor data, while the value of the ranged label indicates the severity. For example, a positive ranged label may indicate a pedestrian indicated in the sensor data, while its magnitude may indicate the number and/or nearness of pedestrians, etc. In an embodiment, discrete, e.g., binary labels, e.g., on/off labels are used. Such non-ranged labels have the advantage that good robustness bounds may be computed with clear semantics, e.g., a radius that indicates the number of label-flips in the training data that will not change the label.

An input data, e.g., a training input data or a novel input data is sometimes referred to as an input point. This does not mean that the training input refers necessarily to geographical point, may rather that the input may be represented as a point in a vector space.

For example, the input data may be sets of sensors values, e.g., represented as a vector. For example, an input may comprise one or more of an image, a temperature, a pressure, and so on. An output may classify the input, e.g., determine if the input represents a particular object, e.g., a pedestrian, a car, a bicycle, etc.; e.g., determine if certain conditions apply, e.g., a machine is in a safe condition, etc.

Classifying data may also comprise actions such as semantically segmenting the sensor data and detecting objects in the sensor data. For example, segmenting sensor data may be used to identify therein objects such as traffic participants, e.g. pedestrians, or machine parts, etc. A semantic segmentation may corresponds to a pixel-wise classification, and detecting objects may correspond to a classification into either one of two classes which may, e.g., be described as "object present" and "object not present".

Interestingly, unlike some conventional uses of randomized smoothing for test-time guarantees, no randomization procedure needs to be applied over the input to the classifier, e.g., over the novel input data, but instead randomization is performed over the entire training procedure of the classifier. By randomizing over the labels during the training process, an overall classification may be obtained that is robust, (e.g., that resists changing its prediction in the presence of label-noise) even when some number of labels are adversarially manipulated in the training set.

As the final prediction is obtained from multiple predictions, obtained from training data that differ by some amount of noise, the final prediction is less sensitive to noise, whether adversarial or not. Yet the predictions are still obtained from a trained classifier and thus are likely to correctly classify the input. Indeed, experiments confirmed that a robust predictor as in an embodiment are hardly less accurate than conventional classifiers if there is no label corruption. However, once label noise is added, especially adversarial label noise, the accuracy of a conventional classifier goes down quickly, while the robust predictor resists this.

Some particular choices for the base classifier may offer additional advantages. For example, the classifier part of the base classifier may comprise a linear operation configured to be applied to a latent representation $(h(x)\beta)$. For example, the linear operation may be a vector which is applied to the latent representation by a dot-product. The entries in the vector may be regarded as the parameters to be trained.

In any case, the base training function may be configured for applying a least-squares optimization to derive parameters, however if the classifier comprises a linear operation, then the least-squares optimization may be performed particularly efficiently. For example, a prediction may be obtained as dot-product between the labels—with or without noise, and vector computed from the training data and/or the novel input data.

Note that after the linear operation, e.g., after the dot-product, further steps may be performed. For example, the output of the linear operation may be regarded as a soft prediction, which can be mapped to a hard prediction, e.g., by mapping it to a 0 or 1 whichever is nearest, in case of a binary label, e.g., rounding towards label values, e.g., 0 or 1, e.g., by mapping or rounding to a 0-1 vector, for multi-label predictions and so on. The training may be done on the soft values, e.g., while a reported prediction obtained from a novel data input and/or a particular instantiation of training data and noise may be regarded after rounding. For example, the classifier may be trained to generate values that are close to 0 or 1 depending on the desired classification, while a prediction obtained during test time, may be regarded as 1 whenever it is larger than and 0 whenever it is smaller than ½.

In an embodiment, a radius is computed that indicates the robustness of the predicted label output, e.g., how much noise can be resisted in the label while not changing the label output. For example, the radius may comprise a number of label changes wherein the predicted label for the novel input will not change.

Such a radius may depend on the training data, but also on the novel input itself. For some novel inputs, the radius may be large, e.g., for situations in which the classification is clear. For some novel inputs the radius may be smaller, e.g., for situations in which the classification is harder.

Interestingly, the radius can be computed automatically, without knowing which of the labels may be corrupted.

Having a radius is an important advantage, especially since it allows build deep classifiers that are provably robust against label-flipping attacks, at least up to the bound indicated by the radius. For example, with its output, a classifier according to an embodiment may include a certification guaranteeing that its prediction would not be different had it been trained on data with some number of labels flipped. Interestingly, in some embodiment, such certified bounds can be obtained with no additional runtime cost over standard classification.

The provided guarantees are independent of the data that is corrupted. It is therefore much more useful than a conventional sanitation approach, as it protects data from targeted, e.g., adversarial, attacks as well as non-adversarial corruption.

Interestingly, it may not even be needed to actually perform repeated training. For example, if the structure of the classifier part of the base classifier is sufficiently amenable to analysis, the likelihood that label-noise at a certain noise level will result in a particular classification, or may induce a prediction change can be computed analytically or alternatively bounded by suitable inequalities. Instead of actually repeatedly performing the training for various instantiations of the labels with label noise, the likelihood can be directly computed or at least directly estimated by computing bounds on the probability. For example, one may estimate by computing bounds when the classifier is configured to compute a linear combination of features generated by the encoder. Although a linear classifier part has a simple structure, experiments have shown that it need not impact the accuracy too much, since the encoder may be much more powerful than the classifier part.

Although, various estimates may be computed, e.g., by approximating the equation in different ways, a particularly advantageous way to compute said inequalities is as by selecting a suitable large class of inequalities, which may be indexed by a variable. At inference time the bound may be improved by selecting that value of the parameter for which the bound is tightest. For example, such an optimization may be performed by using a conventional solver, e.g., a Newton approximation. Inference time may also be referred to as 'test time' or 'prediction time'.

In general there are many ways in which the encoder may be selected. For example, in an embodiment the encoder may comprise a neural network, in particular a deep neural network. The neural network may comprise such layers as convolutional layers, ReLu layers, max pool layers, and so on. The output of the neural network may comprise multiple values which represent features of the input. For example, neural network may be a so-called feature extractor. For example, the encoder input may comprise an image, while the output may be a vector comprising multiple values of multiple features. There are many ways to obtain such an encoder.

The encoder may be trained during a phase, which may be referred to as pre-training, which comes before a phase in which the system is applied to a novel input data. The latter may be called test-time or inference time. Different from conventional systems is that the inference time may contain multiple training rounds. However, it is also possible to train multiple classifiers between the pre-training and inference, in a phase which may be called multiple classifier training. Note that in a preferred embodiment, the multiple classifier training is absent and during inference no additional training is performed, but instead the system relies on estimates, e.g., bounds on the likelihood of a particular label occurring in a particular situation.

Regardless of improvements which obviate the need for training during a classifier training phase or at inference time, the encoder will be trained. Nevertheless, the pre-training may be separate from the use of the encoder. For example, the encoder may be obtained from a third party, e.g., as an off-the-shelf feature extractor, e.g., an image encoder, etc.

Training the encoder may be done in various ways. For example, the encoder may be obtained by training the neural network on the training input data part of the training data. For example, said training may be as a so-called auto encoder.

An unsupervised training method can be applied to pre-train the network's parameters. This has as an advantage that it allows the use of large amounts of unlabeled data. Using unlabeled data for training avoids the possibility of label-noise. After pre-training, the network's parameters are set to a potentially good local minima, from which supervised learning can follow, e.g., referred to as fine-tuning. For example, the fine-tuning may use labeled data, possibly a selected subset of the provided training data. For example, the network may first be trained as an auto encoder, and then fine-tuned by training it in combination with a classifier, e.g., a linear classifier, e.g., using supervised learning. To further reduce the impact of corrupted labels while still using supervised learning, one may train the encoder on more types of labels than will be used at test time. For example, one may even train the encoder on different types of labels than will be used at test time. For example, if the task is to distinguish 1 and 7 labels, then one could train the encoder on other digits than 1 and 7. This ensures that corruption in 1/7 labels will not deteriorate the encoder while it still allows learning features that are relevant to the task.

Training as an autoencoder on the labeled data may be done at the same time. For example, the output of the encoder may be trained to allow to recover the original input, and the combination of encoder and classifier may be trained on the classification problem.

Sparsity conditions may be applied to the auto encoder. For example, sparsity can be defined in terms of population sparsity and lifetime sparsity. On one hand, population sparsity ensures simple representations of the data by allowing only a small subset of outputs to be active at the same time. On the other hand, lifetime sparsity controls the frequency of activation of each output throughout the dataset, ensuring rare but high activation of each output. For example, the autoencoder may be a so-called sparse autoencoder.

Supervised learning of the encoder may be done on a training data which is known to contain no or fewer corruptions. For example, such training data may be selected from a larger pool of training data, e.g., by an expert who may vet the data. One may also opt to train the encoder together with a classifier on the same training data as used during inference. This has the disadvantage that corruption in the labels will influence the training of the encoder. On the other hand, the effect of such corruption would be mitigated by the countermeasures at test time, e.g., actual or simulated repeated training and testing of the classifier part of the base classifier.

For example, supervised learning, e.g., as the only learning or as fine-tuning may be done by training the combination of the encoder and a temporary classifier, e.g., one may train the combination $h(x)\beta$, wherein x is the input data, h is the encoder, and $\beta$ is a vector. When training is complete, the vector $\beta$ may be discarded. Then in a multiple-classifier training phase, or at test time, multiple vectors $\beta'$ may be trained for many combinations of the labels and noise. During the latter training the encoder may be kept fixed. In an embodiment, however, it is not even needed to compute multiple vectors $\beta'$ as instead the result of applying such trainings may be estimated, e.g., by evaluating suitable bounds.

There are also many options, for the classifier part. As noted above, a particularly advantageous choice is to restrict the classifier to a linear operation, possibly followed by a rounding operation. This has the advantage that the predictions are particular tractable, and the results of repeated predictions may be obtained without actually performing the repeated predictions. Nevertheless, many other choices are possible. They may also be amenable to analysis, or even if not, repeated trainings may be performed. The combination of an encoder part and a classifier part has the advantage that training can be restricted to only training the classifier part, which needs fewer resources than training the combination of encoder and classifier fully. Nevertheless, in an embodiment the classifier part is chosen to be small compared to the encoder. For example, the encoder and the classifier, may be defined by parameters, and the number of parameters defining the encoder may be larger than the number of parameters defining the classifier. For example, the encoder may have twice as many or more, ten times as many or more, etc., parameters than the classifier part. For example, the encoder and the classifier comprise a neural network, the encoder neural network comprising more nodes and/or layers than the classifier neural network. For example, the classifier may comprise only a single layer. For example, the encoder may be at least twice, ten times, etc. larger. In an embodiment, the classifier comprises a linear operation and a further non-linear operation. The non-linear operation may be, e.g., a sigmoid operation. In an embodiment, the classifier may comprise a single linear operation and the non-linear operation, e.g., linear operation and a single sigmoid operation for each label output. The non-linear operation may be a value function, e.g., mapping x to max(0,x) or a differential version, e.g., $\ln(1+e^x)$, etc.

There are thus different ways to obtain the robustness. In a first example, training of the classifier part is performed multiple times. The repeated training may be done at inference time or precomputed and stored and applied at inference time. In a second example, training of the classifier is performed multiple times, but the classifier part is arranged so that training and prediction can be combined. For example, in an embodiment, one-pass or online learning is used, wherein the classifier is trained after a single pass over the training data. In the second example, the training and prediction on the novel input are combined so that the training is done at inference time. Note, that nevertheless, one may precompute part of the training. In a third example, the training of the classifier part is not actually performed multiple times, but instead inequalities or the like are used to compute estimates, e.g., bounds, on the likelihood of a particular label prediction in the presence of label-noise. The latter depends on the novel input and so is performed at inference time. In the third example, the resources needed to obtain a prediction are virtually the same as for obtaining a prediction without additional robustness.

Referring back to the radius, this number may be used for various purposes. Although the radius may be associated with a particular input, a radius for the whole system may be obtained by sampling, e.g., for multiple novel inputs and averaging the radii. The two types of radii may be referred to as a particular radius, e.g., for a particular novel input data, and as a global radius, e.g., an average of multiple particular radii.

The radius may be used as measure for quality control—not just for the particular prediction obtained for a novel input, but also as a quality control for whole system, e.g., including the encoder.

For example, one may obtain an estimate of a number of corrupted labels in the training data, and comparing the estimated number of corrupted labels with the radius before accepting the predicted label for the novel input. The estimate may be obtained by having an expert, or another system vet the labels, e.g., a sample thereof. For example, a number of labels may be verified and the number of incorrect labels may be extrapolated for the whole training set. If the estimated number of incorrect labels is lower than a particular radius then the corrupted labels cannot have changed the prediction, and thus the prediction has a high reliability.

In practice, one may use a lower bar. For example, one may define some multiple and accept a prediction if estimated number of corrupted labels, e.g., wrong labels is lower than the multiple times the particular radius. For example, one may take the multiple as 2 or more, 4 or more, etc. In this case, a hard guarantee that may be offered by the radius is lost, but has the advantage that fewer false positives will be generated.

If it turns out that a novel input is rejected, or if more inputs are rejected than some threshold, say more than 10, or more than 1% or the like. Steps may be taken to improve the predictions. For example, one may obtain corrected labels, e.g., from an expert, the new labels may be used for supervised learning of the encoder together with a temporary classifier. For example, one may discard corrupted labels from training data, and retrain the encoder on the corrected training data. On the other hand, one could also use the new or corrected labels for training at classifier training phase or at inference time. In this case, the encoder would stay fixed, but the system would nevertheless be improved because of better training of the classifier part. This would even hold for an embodiment in which repeated training is estimated, as the estimates depend on the training data, in particular on the features and the labels.

The role of an expert may be reduced. For example, during operation of the system in a test phase, e.g., wherein multiple inferences are made. The novel inputs and the corresponding robust predictions may be stored. For example, in case of an autonomous vehicle, the classifier may be called upon many times, and many pairs of input data and label may be collected. An estimate may be obtained of the number of corrupted labels in the stored data. For example, an expert may perform this estimate, however the estimate may also be obtained from a proxy. For example, another system may assist in the estimate. For example, the number of overrides of a user of the autonomous vehicle may be taken as a measure of the quality of the predictions.

If the number of corrupted labels in the stored data is low, in particular, if the estimate is below the global radius, the data can safely be added as additional training material. For example, the additional data may be used for supervised training of the encoder and/or for training in a classifier training phase (if any) or at test time.

Since the predicted labels have increased robustness, e.g., they are less likely to change in the presence of label noise, it is likely that the number of corrupted labels is low. This is all the more so, since the source of this data may be less likely to be corrupted by an adversary.

There are various applications for an embodiment of the method according to the present invention. For example, one may determine a control signal based on a predicted label for the physical system and/or for an autonomous device operating in the physical system. For example, a steering or braking or acceleration signal may depend on a classification of the environment of the vehicle. Alternatively, it may be the physical system itself that is under control, e.g., computer control. For example, the physical system may be a motor or the like, and the control signal may control the motor or the like. For example, if the physical system is unsafe, it may shutdown the system or put it in a stable state. For example, a manufacturing machine may enter a controlled shut-down, whereas an autonomous vehicle may transfer control back to a human operator.

For example, conventional control systems may base their decisions on one or more physical quantities of the physical system. Various physical quantities, for example, pressure, density, or rotation speed, may be measured directly relatively easily, e.g., using one or more sensors. For other physical quantities however, such as a filling mass flow or a relative air mass of a motor, performing a direct measurement may be expensive, cumbersome, or sensors for directly measuring the quantity may not be available. To enable control of the machine based on such physical quantities, it is beneficial to classify the state of the machine directly from the sensor data that is available.

An aspect of the present invention concerns a classifying system configured to classify sensor data with improved robustness against label noise. The system may be implemented in a single device or distributed over multiple devices. For example, the system may be used in a controller, e.g., comprised in the controller.

In accordance with an example embedment of the present invention, the classifying system is electronic. For example, it may be an electronic device, e.g., a mobile electronic device. The classifying system may be a mobile phone, set-top box, smart-card, computer, etc.

Embodiments of the present invention may be applied to sensor signals, received from many types of sensors, such as, e.g., video, radar, LiDAR, ultrasonic, motion. For example, the sensor signal may comprise an image, e.g., of an environment of an image sensor, e.g., a traffic situation, e.g., a physical system, e.g., a manufacturing machine, e.g., a robot, e.g., a robot arm. A classification produced by an embodiment from a sensor signal and training data may be used to compute a control signal for controlling a physical system, like e.g., a computer-controlled machine, like a robot, a vehicle, a domestic appliance, a power tool, a manufacturing machine, a personal assistant or an access control system. For example, said computing may comprise classifying the sensor data. For example, a traffic participant may be classified as a pedestrian, in response to which a control signal for an autonomous vehicle is computed or modified, e.g., a speed of a car may be reduced.

An embodiment of the classifying method in accordance with the present invention may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment of the present invention, the computer program comprises computer program code adapted to perform all or part of the steps of an embodiment of the method when the computer program is run on a computer. Preferably, the computer program is embodied on a computer readable medium.

Another aspect of the present invention is a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments will be described, by way of example only, with reference to the figures. Elements in the figures are illustrated for simplicity and clarity and have not necessarily been drawn to scale. In the figures, elements which correspond to elements already described may have the same reference numerals.

Figure 1:
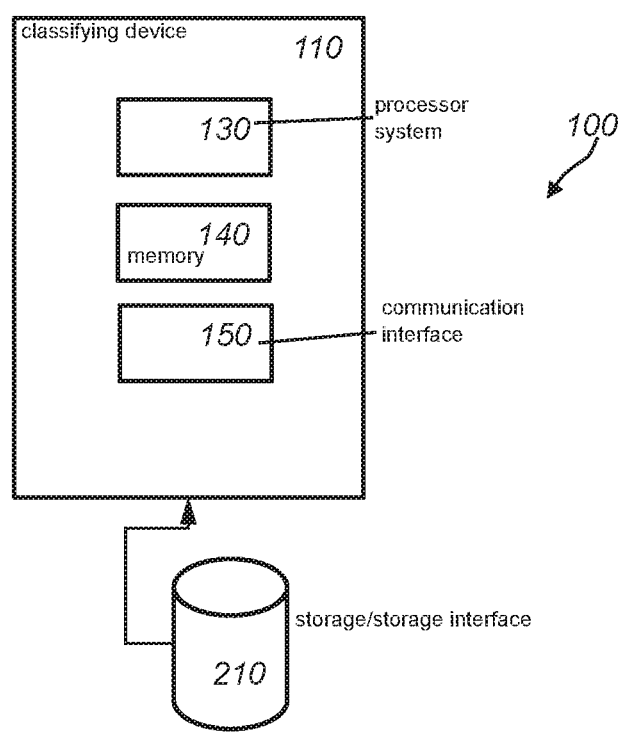
FIG. 1 schematically shows an example of an embodiment of a classifying system in accordance with the present invention.

| LIST OF REFERENCE NUMERALS IN FIGS. 1-4, 6, 7: | |
|---|---|
| 100 | classifying system |
| 110 | classifying device |
| 130 | processor system |
| 140 | memory |
| 150 | communication interface |
| 200, 300 | classifying system |
| 210 | input interface for novel input data |
| 220 | encoder |
| 225 | encoder trainer |
| 230 | classifier |
| 235 | classifier trainer |
| 237 | noise adder |
| 240 | aggregator |
| 250 | output interface |
| 330 | estimator |
| 335 | pre-computer |
| 340 | radius computer |
| 350 | output interface |
| 600 | a classifying and control system |
| 610 | a sensor system |
| 620 | a classifying system |
| 630 | a controller |
| 640 | an updater |
| 1000 | a computer readable medium |
| 1010 | a writable part |
| 1020 | a computer program |
| 1110 | integrated circuit(s) |
| 1120 | a processing unit |
| 1122 | a memory |
| 1124 | a dedicated integrated circuit |
| 1126 | a communication element |
| 1130 | an interconnect |
| 1140 | a processor system |

DETAILED DESCRIPTION OF EXAMPLE EMBODIMENTS

While the presently invention is susceptible of embodiments in many different forms, there are shown in the figures and will herein be described in detail one or more specific embodiments, with the understanding that the present disclosure is to be considered as exemplary of the principles of the presently invention and not intended to limit it to the specific embodiments shown and described.

In the following, for the sake of understanding, elements of embodiments are described in operation. However, it will be apparent that the respective elements are arranged to perform the functions being described as performed by them.

Further, the present invention is not limited to the example embodiments, and features described herein may be combined in different ways.

FIG. 1 schematically shows an example of an embodiment of a classifying system 100 in accordance with the present invention. For example, the classifying system 100 of FIG. 1 may be used to classify sensor data according to one or more labels.

Classifying system 100 may comprise a processor system 130, a memory 140, and a communication interface 150. Classifying system 100 may be configured to communicate with a training data storage 210. Storage 210 may be a local storage of system 100, e.g., a local hard drive or memory. Storage 210 may be non-local storage, e.g., cloud storage. In the latter case, storage 210 may be implemented as a storage interface to the non-local storage. A classifying system like system 100 may be distributed over different devices in various ways. For example, as shown in FIG. 1, a classifying device 110 may comprise processor system 130, memory 140, and communication interface 150. But other solutions are possible.

Systems 110 may communicate within itself, or with other systems, external storage, input devices, output devices, and/or one or more sensors over a computer network. The computer network may be an internet, an intranet, a LAN, a WLAN, etc. The computer network may be the Internet. The systems comprise a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

For example, system 100 may comprise a communication interface 150. The computer network may comprise additional elements, e.g., a router, a hub, etc. In system 100, the communication interface 150 may be used to receive inputs, such as training data or novel input data, and to provide outputs, e.g., a robust prediction.

Figure 2:
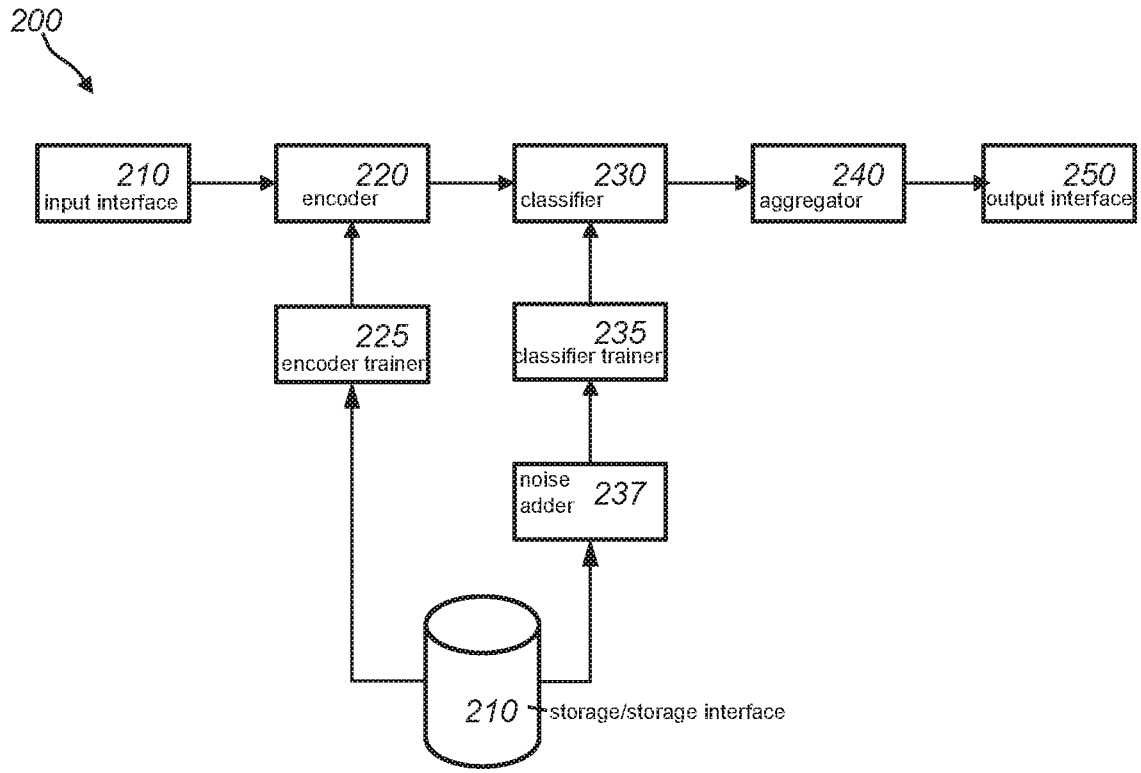
FIG. 2 schematically shows an example of an embodiment of a classifying system in accordance with the present invention.
Figure 3:
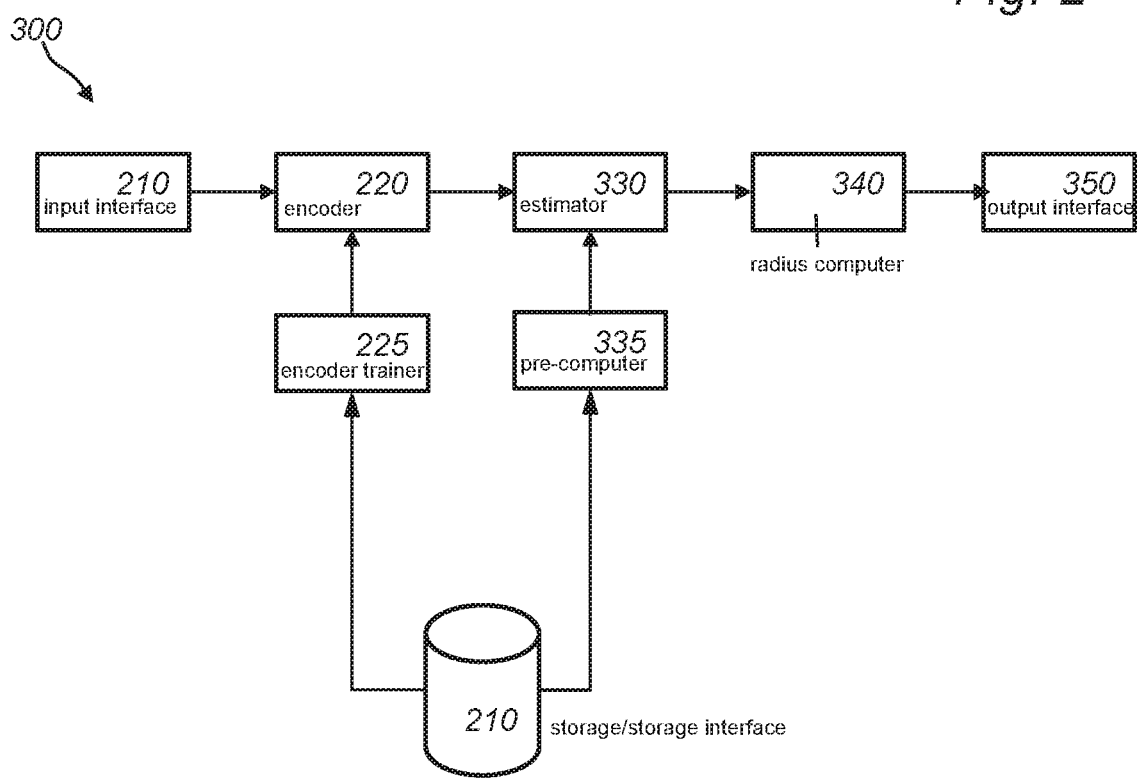
FIG. 3 schematically shows an example of an embodiment of a classifying system in accordance with the present invention.

The execution of system 100 may be implemented in a processor system, e.g., one or more processor circuits, e.g., microprocessors, examples of which are shown herein. FIGS. 2 and 3 show functional units that may be functional units of the processor system. For example, FIGS. 2 and 3 may be used as a blueprint of a possible functional organization of the processor system. The processor circuit(s) are not shown separate from the units in these figures For example, the functional units shown in FIGS. 2 and 3 may be wholly or partially implemented in computer instructions that are stored at system 100, e.g., in an electronic memory of system 100, and are executable by a microprocessor of system 100. In hybrid embodiments, functional units are implemented partially in hardware, e.g., as coprocessors, e.g., neural network coprocessors, and partially in software stored and executed on system 100. Parameters of the network and/or training data may be stored locally at system 100 or may be stored in cloud storage.

FIG. 2 schematically shows an example of an embodiment of a classifying system 200 in accordance with the present invention.

Shown in FIG. 2 are an encoder 220, h and a classifier 230. Encoder and classifier together combine to classify inputs. For example, a novel input data 210 received on an input interface 210, e.g., may be mapped by encoder 220 to a latent representation, e.g., a feature representation. Classifier 230 may then map the latent representation to a classification prediction. For example, the prediction may be provided on an output interface 250. For example, the input may be received from one or more sensors, e.g., an image sensor, etc. For example, the input may be received in digital form. For example, the output interface may provide the predicted classification to a controller, e.g., to compute a control signal. For example, the control signal may depend on the classification, say, to reach some goal, or operate within safe boundary conditions, and so on. For example, the input and output interface may comprise an API, a connector, a wireless interface, an antennae, and so on.

The encoder may comprise a neural network, typically a deep neural network. For example, the encoder may be a feature extractor. It is possible that the extractor is pre-trained, possibly even independent from classifier 230 and/or system 200. However, system 200 may comprise an encoder trainer 225 for training the encoder, or for fine-tuning the encoder. The training may be done with or without a (temporary) classifier, such as classifier 230. For example, the encoder may be trained in a supervised manner with training data comprising pairs of input data and labels. For example, the encoder may be training in an unsupervised manner, e.g., as an autoencoder.

Training module 225 is optional. For example, the encoder may be pre-trained, which may be done off-line. For example, the encoder may be obtained from a third party, etc. On the other hand, having a training module 225 has the advantage that fine-tuning, e.g., additional training, e.g., additional supervised training may be done—even after the system has been used for inference.

The embodiment shown in FIG. 2 comprises a classifier 230. As discussed, and as will be further shown below, also the classifier is optional.

Classifier 230 takes the output of encoder 220, e.g., a latent representation of the sensor signal obtained from interface 210, and uses it to perform the classification. In an embodiment, classifier 230 may be trained on the training data 210 but with noise added to it. For example, the system may comprise a noise adder 237 and a classifier trainer 235. For example, classifier trainer may be trained multiple times, e.g., at least ten times, e.g., at least 1000 times, etc. The trained classifiers may be stored, and re-used. A trained classifier may also be used once for a single prediction and then discarded.

Noise adder may for example, add noise to the labels, e.g., according to some pre-defined noise level. For example, the noise level may be represented with a parameter q. For example, one may change a label with a probability q. If the labels are binary labels, then the label may be switched with a probability q. For example, if the label is a ranged label, an amount of noise may be added to it, e.g., Gaussian noise, e.g., with a mean and variance defined by the noise level. For example, with a probability q, such a label may be flipped between 0 and non-zero. If the label is non-zero, then an additional amount of noise may be added to it.

The classifier trainer may be suitable for the type of classifier. For example, this may be regression learning. This may be used, e.g., if the classifier comprises a neural network, perhaps only a single layer. If the classifier comprises a linear operation, then least squares learning is particularly advantageous, since a one-pass learning approach is possible.

The training data may be precomputed, at least in part. For example, the part related to the input data may be prepared, e.g., the encoder 220 may be applied to it. Other computation steps may be precomputed as well, for example, if least squares learning is used, one may precompute an inverse, such as the Moore-Penrose inverse, e.g., the matrix $X(X^TX)^{-1}$ may be precomputed. For example, if regularization is used, the matrix $X(X^TX+\lambda I)^{-1}$ may be precomputed, etc. It was found that regularization performed better.

The multiple learned classifiers are applied to a novel input data, which may be obtained from interface 210. The results may be aggregated by aggregator 240. For example, aggregator may count which label occurs most often. The results of aggregator 240 may be forwarded to an output interface. The output interface may be a display interface, e.g., to display the result on a display. The output interface may be a digital interface, e.g., to electronically send the result, etc. The aggregator may also output how many of the classifiers produced this result, even in the presence of noise, e.g., as a percentage. For example, the aggregator may compute a variance of the multiple classifier predictions.

During the training of the multiple classifiers, the encoder is typically not further trained. This has the advantage that training of the classifier is faster, probably much faster than training together with the encoder. This performs better if some type of one-pass learning is available. Least square learning for a linear classifier is a particular good example, of one-pass learning, but many other conventional approaches are available.

In addition to computing a robust prediction, e.g., the most common prediction when many classifiers are applied which are trained on slightly different noise data, one can compute other variables. For example, one may compute or estimate the number labels the noise-level at which the predicted label becomes less reliable. For example, the noise level at which the predicted level is given for less than 50% of the classifiers. Instead of 50% one can take other percentages.

The multiple learned classifiers may also be applied to a training input data, for example, in order to find training data pairs which are likely to be false. For example, if the robust predicted output differs from the label in the training data.

A different approach to system 200 is shown in FIG. 3. FIG. 3 schematically shows an example of an embodiment of a classifying system 300 in accordance with the present invention. Like system 200, system 300 also comprises an input interface 210, and an encoder 220. Encoder 220 may be trained by a training module 225 from training data 210. The latter is optional however. Like in system 200, the encoder 220 is compatible with a classifier part, e.g., like classifier 230. Furthermore, system 200 produces a more robust prediction by estimating which label is generated most often when multiple classifiers where applied to, wherein the multiple classifiers are trained on training labels having additional noise.

However, different from system 200, in system 300 that multiple predictions are not in actuality performed. Accordingly, multiple trained classifiers, whether pre-computed or computed on the fly, are not needed either. Instead, an estimator 330 estimates directly, how likely a particular label prediction is, assuming some level of label noise. For example, one may compute bounds, e.g., inequalities that bound these probabilities.

One particular, efficient way to compute good bounds, is by not defining such bounds fully in advance, but rather define a large number of such bounds, e.g., indexed by some value t. For example, this approach is used in so-called Chernoff bounds. At inference time, one can select the best inequality, giving the tightest bounds.

Estimating the number of times a particular label will occur assuming some level of label noise, is easier if the classifier is smaller. This is similar to system 200, where repeated training of classifier 230 is easier if classifier 230 is smaller. For example, one may elect to include a linear operation in classifier 230. Such a linear classifier is amenable to one-pass training, e.g., using a least squares approach, possibly regularized. One can show that a particular prediction for a particular novel input reduces to a dot-product over the training labels. Thus a prediction can be obtained as $(\alpha^T y)$, wherein y represents the training labels and $\alpha^T$ depends on the training inputs as well as on the novel input. Having this expression, one can compute direct bounds on how likely $(\alpha^T y)$ is less than and thus would produce a 0 label, if the vector y now contains noise. Likewise, one may estimate directly rather than simulate the probability that that it is more than ½ and thus would produce a 1 label. Where this a ranged label, then one could also compute the likelihood of that $(\alpha^T y \geq \gamma)$ for any desired γ. Instead of direct estimation one could also use the $\alpha^T y$ representation for fast simulation as well.

As pointed out, system 200 and 300 may be implemented on a computer or on a combination of computers, e.g., on system 100.

In the various embodiments of system 100, 200 and 300, the communication interfaces may be selected from various alternatives. For example, the interface may be a network interface to a local or wide area network, e.g., the Internet, a storage interface to an internal or external data storage, a keyboard, an application interface (API), etc.

The systems 100, 200 and 300 may have a user interface, which may include conventional elements such as one or more buttons, a keyboard, display, touch screen, a pointing device, such as a mouse, etc. The user interface may be arranged for accommodating user interaction for configuring the systems, training the networks on a training set, or applying the system to new sensor data, etc.

Storage may be implemented as an electronic memory, say a flash memory, or magnetic memory, say hard disk or the like. Storage may comprise multiple discrete memories together making up a storage, e.g., 140, 210. Storage may comprise a temporary memory, say a RAM. The storage may be cloud storage.

System 100, 200 and 300 may be implemented in a single device. Typically, the systems 100, 200, 300 each comprise one or more microprocessors which execute appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, systems 100, 200, 300 may comprise circuits for the evaluation of neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 6:
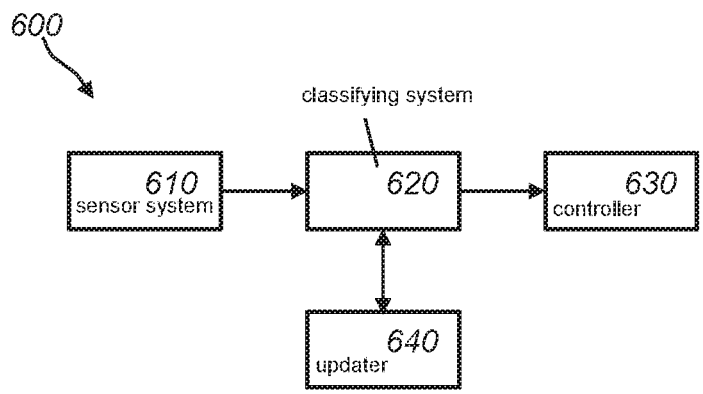
FIG. 6 schematically shows an example of an embodiment of a classifying system in accordance with the present invention.

FIG. 6 schematically shows an example of an embodiment of a classifying system 600 illustrating various applications and improvements in accordance with the present invention. System 600 shown in FIG. 6 comprises a sensor system 610, a classifying system 620, and a controller 630. For example, sensor system 610 may comprise a camera, LIDAR, etc., and produce a sensor signal for classifier 620. For example, the sensor signal may comprise an image. The classification of system 620 is used by the controller 630. For example, system 600 may be used in an autonomous machine, e.g., an autonomous vehicle.

In an embodiment, controller 630 may receive an indication of the quality of a classification from classifier 620. For example, controller may receive an estimate, or a bound on, the radius and only accept the prediction if the latter is smaller than an estimated number of corrupted labels, or only accept if the latter is smaller than a multiple of the estimated number of corrupted labels. For example, controller 630 may receive the variance of the predicted classifications, e.g., predicted according to noisy labels. Controller may be configured to accept the classification only if the reported variance is below a bound.

In an embodiment of the present invention, system 600 comprises an updater 640. For example, updater 640 may be configured to record situations in which a classification was not accepted because of too low quality. Such examples may be added to the training data, but with corrected labels. Moreover, training data can be improved by correcting corrupted labels, after they have been found. For example, the improved and/or extended training may be used to train or re-train, e.g., fine-tune the encoder used in system 620.

For example, updater 640 may store not just examples of classification what were not accepted, but also, or only, cases where the classification was accepted. The number of wrong, e.g., corrupted labels in the recorded examples may be estimated, e.g., automatically, or by a human expert. Updater 640 may be configured to re-train the encoder using the recorded input sensor data together with the predicted labels if the estimated number of wrong labels in the recorded data is lower than a radius of the system. In the latter case, the radius may be taken as a global radius.

In an embodiment of the present invention, sensors system 610, classifier 620, and controller 630 may be implemented in a single device, e.g., a car, while the updater 640 is implemented on one or more computers in the cloud.

Below several further optional refinements, details, and embodiments of the present invention are illustrated.

Robustness against label-flipping attacks may be obtained by randomized smoothing during training. A generic approach to certifying robustness against label flipping attacks or in fact, data poisoning attacks in general is achieved, e.g., using a method including a randomized smoothing procedure. This general approach can be improved for some specific cases, such as label-flipping attacks, using least-squares classification.

For simplicity, an embodiment for binary-valued functions is first described. For example, this may be used for binary classification problems. The approach may be extended to a multiclass setting as is expanded upon further below.

One may construct a randomized smoothing operator that maps a binary-valued function $\phi: \mathcal{X} \to \{0,1\}$ and a smoothing measure $\mu: \mathcal{X} \to \mathbb{R}_+$, with $\int_\mathcal{X} \mu(x)dx=1$, to the expected value of $\phi$ under $\mu$, e.g.

$$G(\mu,\phi)=E_{x\sim\mu}[\phi(x)]=\int_\mathcal{X}\mu(x)\phi(x)dx. \quad (1)$$

One may use $g(\mu,\phi)$ to denote the "hard threshold" version of G, e.g., the smoothed version which predicts the most probable output of $\phi$ under $\mu$. In the binary case this can be done by checking whether the expectation is greater than ½:

$$g(\mu,\phi)=1\{G(\mu,\phi)\geq\tfrac{1}{2}\}. \quad (2)$$

Intuitively, for two smoothing measures $\mu,\rho: \mathcal{X} \to \mathbb{R}_+$ that are very similar, one may expect that for most $\phi$, $g(\mu,\phi)=g(\rho,\phi)$. Further, the degree to which $\mu$ and $\rho$ can differ while still preserving this property should increase as $G(\mu,\phi)$ approaches either 0 or 1, because this increases the "margin" with which the function $\phi$ is 0 or 1 respectively over the measure $\mu$. More formally, a general randomized smoothing guarantee may be defined as follows:

Definition 1 Let $\mu,\rho: \mathcal{X} \to \mathbb{R}_+$ be two smoothing measures over $\mathcal{X}$. Then a randomized smoothing robustness guarantee is a specification of a distance measure $d(\mu,\phi$ and a function $f: [0,1]\to\mathbb{R}$ such that for all $\phi: \mathcal{X} \to \{0,1\}$ $$g(\mu,\phi)=g(\rho,\phi), \text{ whenever } d(\mu,\rho)\leq f(G(\mu,\phi)). \quad (3)$$

Example 1 A randomized smoothing guarantee may use the smoothing measure $\mu = \mathcal{N}(x_0,\sigma^2 I)$, a Gaussian around the point $x_0$ to be classified, $\rho = \mathcal{N}(x_0+\delta,\sigma^2 I)$ a Gaussian around a perturbed example, and may take the form $$d(\mu,\rho) = \frac{1}{\sigma}\|\delta\|_2 \equiv \sqrt{2KL\mu\rho}, \; f(p) = |\Phi^{-1}(p)| \quad (4)$$

where KL(•) denotes KL divergence and $\Phi^{-1}$ denotes the inverse CDF of the Gaussian distribution.

Randomized smoothing of continuous data may thus be done Gaussian noise, but this is by no means a requirement. For instance, as an alternative approach for dealing with discrete variables in the following example.

Example 2 A randomized smoothing guarantee may use the factorized smoothing measure $\mu_{\alpha,K} = \prod_{i=1}^{d}\mu_{\alpha,K,i}$ for $\alpha \in [0,1], K \in \mathbb{N}$, defined with respect to a base input $x_0 \in \{0, \ldots, K\}^d$, where $$\mu_{\alpha,K,i}(x_i) = \begin{cases} \alpha, & \text{if } x_i = x_{0_i} \\ \dfrac{1-\alpha}{K}, & \text{if } x_i \in \{0, \ldots, K\}, x_i \neq x_{0_i} \end{cases}.$$

$\rho$ is similarly defined for a perturbed input $x_1$. Their guarantee may take the form $$d(\mu,\rho) = r \stackrel{def}{=} \|x_1 - x_0\|_0, \quad (5)$$
$$f(p) = g_{\alpha,K,d}(\max(p, 1-p)).$$

Put into words, the smoothing distribution may be such that each dimension is independently untouched with probability $\alpha$, or perturbed to a different value uniformly at random with probability $1-\alpha$. Here, g is a function that may be precomputed combinatorially: For example, $g_{\alpha,K,d}(p)$ may be defined as the maximum number of dimensions by which $\mu_{\alpha,K}$ and $\rho_{\alpha,K}$ can differ such that a set with measure p under $\mu_{\alpha,K}$ is guaranteed to have measure at least ½ under $\rho_{\alpha,K}$. One may prove that this value is independent of $x_0$ and $x_1$, depending solely on $\alpha$, K, and d.

Yet a further example, is a form of randomized smoothing that doesn't require strict assumptions on the distributions, but which still allows one to provide similar guarantees.

Example 3 (Generic bound from) Given any two smoothing distributions $\mu, \rho$, we have the generic randomized smoothing robustness certificate:

$$d(\mu,\rho)=KL_{\rho\mu}, f(p)=-\tfrac{1}{2}\log(4p(1-p)). \quad (6)$$

The last two randomized smoothing guarantees may be applied particularly advantageously to binary variables, e.g., the labels in a binary classification task.

Note that in practice, for most classifiers, the function value $G(\mu,\phi)$ cannot be computed exactly. For example, one may resort to Monte Carlo approximation instead. For example, one could perform a type of randomized smoothing, in which one draws multiple random samples from $\mu$, use these to construct a high-probability bound on $G(\mu,\phi)$, and then certify the classifier with this bound. More precisely, this bound should be a lower bound on $G(\mu,\phi)$ in the case that the hard prediction $g(\mu,\phi)=1$ and an upper bound otherwise; this ensures in both cases that we underestimate the true radius of certified robustness for the classifier. After obtaining these estimates, e.g., as in this manner, they can be plugged into a corresponding randomized smoothing robustness guarantee to provide a high probability certified robustness bound for the classifier.

One could apply randomized smoothing at test time, e.g., with the function $\phi: \mathcal{X} \to \{0,1\}$ being a classifier itself that we wish to smooth. The classifier may be a deep classifier, e.g., a neural network. Note here that there is no requirement that the function $\phi$ be a deep classifier, nor that it be a traditional classifier at all. One might apply it to any mapping from some input space to one or more outputs, e.g., binary outputs.

However, in an embodiment of the present invention, a very different form of randomized smoothing is used. Instead of treating $\phi$ as a trained classifier, one may consider $\phi$ to be an arbitrary learning algorithm which may take as input a training dataset $\{x_i, y_i\}_{i=1}^n \in (\mathcal{X} \times \{0,1\})^n$ and an additional example $x_{n+1}$ without a corresponding label, which one aims to predict. In other words, the combined goal of $\phi$ is to first train a classifier on $\{x_i, y_i\}_{i=1}^n$ and then output a prediction in $\{0,1\}$ on the new example $x_{n+1}$. Thus, one may consider test time outputs to be a function of both the test time input and of the training data that produced the classifier. This perspective allows one to reason about how changes to training data affect the classifier at test time.

When applying randomized smoothing to this setting, one may randomize over the labels in the training set, $y_{1:n}$, rather than the over the inputs. Analogous to previous applications of randomized smoothing, if the predictions from this process have a large margin when trained with these randomly perturbed labels, it will confer a degree of adversarial robustness to some number of adversarially corrupted labels. In an embodiment, randomizing over the training input may be combined with randomizing over the novel input $x_{n+1}$.

To formalize this intuition, consider two different assignments of n training labels $Y_1, Y_2 \in \{0,1\}^n$ which differ by precisely r labels. Let $\mu$ and $\rho$ be the distributions resulting from independently flipping each of the labels in $Y_1$ and $Y_2$ respectively with probability q, and let $\mu_i, \rho_i$ be the distributions of a single label $y_i$.

It is clear that as r increases, $d(\mu, \rho)$ should also increase. In fact, it can be shown mathematically that the closed form for the exact KL divergence between these two distributions is $$r(1-2q)\log\left(\frac{1-q}{q}\right). \quad (7)$$

Plugging in the robustness guarantee (6), one obtains that that $g(\mu, \phi) = g(\rho, \phi)$ so long as $$r \le \frac{\log(4p(1-p))}{2(1-2q)\log\left(\frac{q}{1-q}\right)}, \quad (8)$$

where $p = G(\mu, \phi)$. This implies that for any training set and test point, as long as (8) is satisfied, g's prediction will not change for up to r flips. This bound behaves precisely as one would expect as a function of p and q: g will stay constant for more label flips as the margin p increases and as the variance of the label noise q increases, effectively drowning out the difference between $Y_1$ and $Y_2$.

This approach has a simple closed form, but the bound is not tight. A tight bound may be derived via a combinatorial approach. By precomputing the quantities $g_{1-q,1,n}^{-1}(r)$ from Equation (5) for each r, one can compare $G(\mu, \phi)$ to each of these and thereby certify robustness to the highest possible number of label flips. This computation can be more expensive, but it provides a significantly tighter robustness guarantee, certifying approximately twice as many label flips for a given bound on $G(\mu, \phi)$. Experiments used this tighter bound, but it is emphasizes that meaningful results can be achieved even with the looser bound, which is moreover orders of magnitude cheaper to compute.

There is an impracticality of the algorithm described in the previous section, if considered naively: treating the function $\phi$ as an entire training-plus-single-prediction process would require that we train multiple classifiers, over multiple random draws of the labels y, all to make a prediction on a single example. However, in an embodiment of the present invention, the architecture and training process may be restricted in a manner that drastically reduces this cost, bringing it in line with the cost of classifying a single example. In fact, the training of multiple classifiers may be eliminated all-together even though obtaining the same results.

For example, given a training set, such as $\{x_i, y_i\}_{i=1}^n$, we assume that there exists a feature mapping h: $\mathbb{R}^d \to \mathbb{R}^k$, which typically would comprise a deep network pre-trained on a similar task, or possibly trained in an unsupervised fashion on $x_{1:n}$, e.g., independent of the training labels, which are presumed to be potentially poisoned. The training on the labels may then be simplified to learning a mapping from a latent represent $h(x_i)$ to a label $y_i$. For example, one may restrict the latter training process for the classifier $\phi$ to be done via a linear least-squares solve.

Assuming the existence of an encoder h, is not such a large assumption. Using pre-trained models in a meta-learning setting, shows for example, the transferability of pre-trained features. Given this feature mapping h, let $X = h(x_{1:n}) \in \mathbb{R}^{n \times k}$ be the training point features and let $y = y_{1:n} \in \{0, 1\}^n$ be the labels. In this example, the training process comprises finding the least-squares fit to the training data, e.g., finding parameters $\hat{\beta} \in \mathbb{R}^k$ via the normal equation $$\hat{\beta} = (X^T X)^{-1} X^T y. \quad (9)$$

One may make a prediction on a novel input via the linear function $h(x_{n+1})\hat{\beta}$. It was found that fitting a classification task with least-squares loss works quite well in practice.

One may represent the prediction as a function of the labels, e.g., in a so-called kernel representation. For example, in the case of a least-squares approach, it reduces the prediction to a linear function of y, which simplifies randomizing over the labels. Specifically, letting $$\alpha = X(X^T X)^{-1} h(x_{n+1})^T, \quad (10)$$

the prediction $h(x_{n+1})\hat{\beta}$ can be equivalently given by $\alpha^T y$.

The latter may be regarded as the kernel representation of the linear classifier. Thus, we can compute a one time and then randomly sample many different sets of labels in order to build a standard randomized smoothing bound. Further, we can pre-compute a term that represents the inputs, in this case, the $X(X^T X)^{-1}$ term, and reuse it for multiple test points.

$l_2$ Regularization for better conditioning

It may be the case that the training points are not well-behaved for linear regression in feature space. To address this, one may instead solve an $l_2$ regularized version of least-squares. Also in this type of training, a pre-computable closed-form solution to this problem exists. For example, one may instead solve $$\alpha = X(X^T X + \lambda I)^{-1} h(x_{n+1})^T. \quad (11)$$

The other parts of our algorithm remain unchanged. The regularization parameter may be determined empirically, but a good example is, $$\lambda = (1+q)\frac{\hat{\sigma}^2 k}{n}\kappa(X^T X)$$

where $\hat{\sigma}^2$ is an estimate of the variance and $\kappa(\cdot)$ is the condition number equal to the ratio of the largest and smallest singular values. The $(1+q)$ term is added to help account for the variance caused by label flips. For example, one may estimate the variance as $$\hat{\sigma}^2 = \frac{\|X\beta - y\|^2}{n-d}.$$

What makes the randomized smoothing approach even more compelling in this setting is that due to the linear structure of this prediction, one can in fact forego a sampling-based approach entirely and directly bound the tail probabilities, e.g., using Chernoff bounds. Specifically, because the underlying prediction function $\phi$ will predict a label 1 for the new example $x_{n+1}$ whenever $\alpha^T y \geq \frac{1}{2}$ and 0 otherwise, one can easily form an upper bound on the probability that the hard prediction results in one prediction or the other via the Chernoff bound. That is, one can upper bound the probability that the classifier outputs the label 0 by $$P(\alpha^T y \leq 1/2) \leq \min_{t>0}\left\{e^{t/2}\prod_{i=1}^n E[e^{-t\alpha_i y_i}]\right\}$$

$$= \min_{t>0}\left\{e^{t/2}\prod_{i:y_i=1}(q+(1-q)e^{-t\alpha_i})\prod_{i:y_i=0}((1-q)+qe^{-t\alpha_i})\right\}.$$

Conversely, the probability that the classifier outputs the label 1 has the analogous upper bound $$P\left(\alpha^T y \geq \frac{1}{2}\right) \leq \min_{t>0}\left\{e^{-\frac{t}{2}}\prod_{i=1}^n E[e^{t\alpha_i y_i}]\right\}. \quad (13)$$

This is the same bound as in the previous case evaluated at $-t$, so to determine both the label that the smoothed classifier will predict and an upper bound on the probability of the opposite prediction, one can solve the minimization problem unconstrained over $t$, and then let the sign of the $t$ dictate which label to predict and the value of $t$ determine the bound.

Note that it will not necessarily always be the case that one of the predictions is upper bounded by $\frac{1}{2}$, but one of the bounds will typically be vacuous; we may therefore define the classifier's prediction according to the non-vacuous bound. The optimization problem over $t$ may be solved by noting that the objective is log-convex in $t$. That is, one can minimize the log of the above expression:

$$\min_t\left\{\frac{t}{2} + \sum_{i:y_i=1}\log(q+(1-q)e^{-t\alpha_i}) + \sum_{i:y_i=0}\log((1-q)+qe^{-t\alpha_i})\right\}. \quad (18)$$

This is a one-dimensional convex optimization problem which can be solved using a many methods, e.g., using Newton's method.

Algorithm 1 below, is an embodiment of randomized smoothing for label-flipping robustness. In this embodiment, there is actually no sampling done in the final algorithm. Instead, the desired bounds on the probability are computed directly, in this case, via the Chernoff bound, without any need to resort to Monte Carlo approximation. Thus, the method is able to generate certifiable robust predictions against label-noise using approximately the same complexity as a traditional prediction. This assumes that the cost of the model is dominated by the cost of computing the features $h(x_i)$ for all training points $x_i$.

Algorithm 1: Randomized smoothing for label-flipping robustness Input: feature mapping $h:\mathbb{R}^d \to \mathbb{R}^k$; noise parameter q; training set $\{(x_i,y_i) \in \mathbb{R}^d \times \{0,1\}\}_{i=1}^n$ (potentially with adversarial labels); additional input to predict $x_{n+1}$.

1. Precompute matrix M:

$$M = X(X^T X + \lambda 1)^{-1}$$

where $X \equiv h(x_{1:n})$ and $$\lambda = (1+q)\frac{\hat{\sigma}^2 k}{n}\frac{\sigma_{max}(X^T X)}{\sigma_{min}(X^T X)} j = 1, \ldots, m$$

(12)

a. Compute a vector $$\alpha = Mh(x_{n+1})^T \quad (15)$$

b. Compute optimal Chernoff parameter t via an optimization, e.g., using Newton's method $$t^* = \arg\min_t\{t/2 + \Sigma_{i:y_i=1}\log(q+(1-q)e^{-t\alpha_i}) + \Sigma_{i:y_i=0}\log((1-A)+qe^{-t\alpha_i})\} \quad (16)$$

and let $p^* = 1 - e^{|t^*|}$

Output: Prediction $\hat{y}_{n+1} = 1\{t \geq 0\}$ and certified radius, guaranteeing prediction will remain constant for up to r flips, where $$r = \left\lfloor \frac{\log(4p^*(1-p^*))}{2(1-2q)\log\left(\frac{q}{1-q}\right)} \right\rfloor \quad (17)$$

(or a larger radius using an exact method)

Various experiments were performed. For example, experiments were done on the MNIST 1/7 test case, and the Dogfish binary classification challenge. The latter was taken from ImageNet. For each dataset we computed the certified test set accuracy at r label flips. That is, for each possible number of adversarial flips r, one may plot the fraction of the test set that was both correctly classified and certified to not change under at least r flips.

Because these datasets represent binary classification tasks, one could technically achieve a certified accuracy of 50% at r=∞ by letting g be constant. This would seem to imply that any number of flips certified at an accuracy less than 50% is not meaningful. However, we note that the accuracy is a function of the transferability of the pre-trained feature embedder; one could substantially improve the accuracy certified for a given r and q with a more carefully chosen pre-trained network. Further, observe that at 0 label flips our certification procedure still achieves highly significant accuracy, e.g., 97.6% on MNIST with q=0.1.

Figure 4:
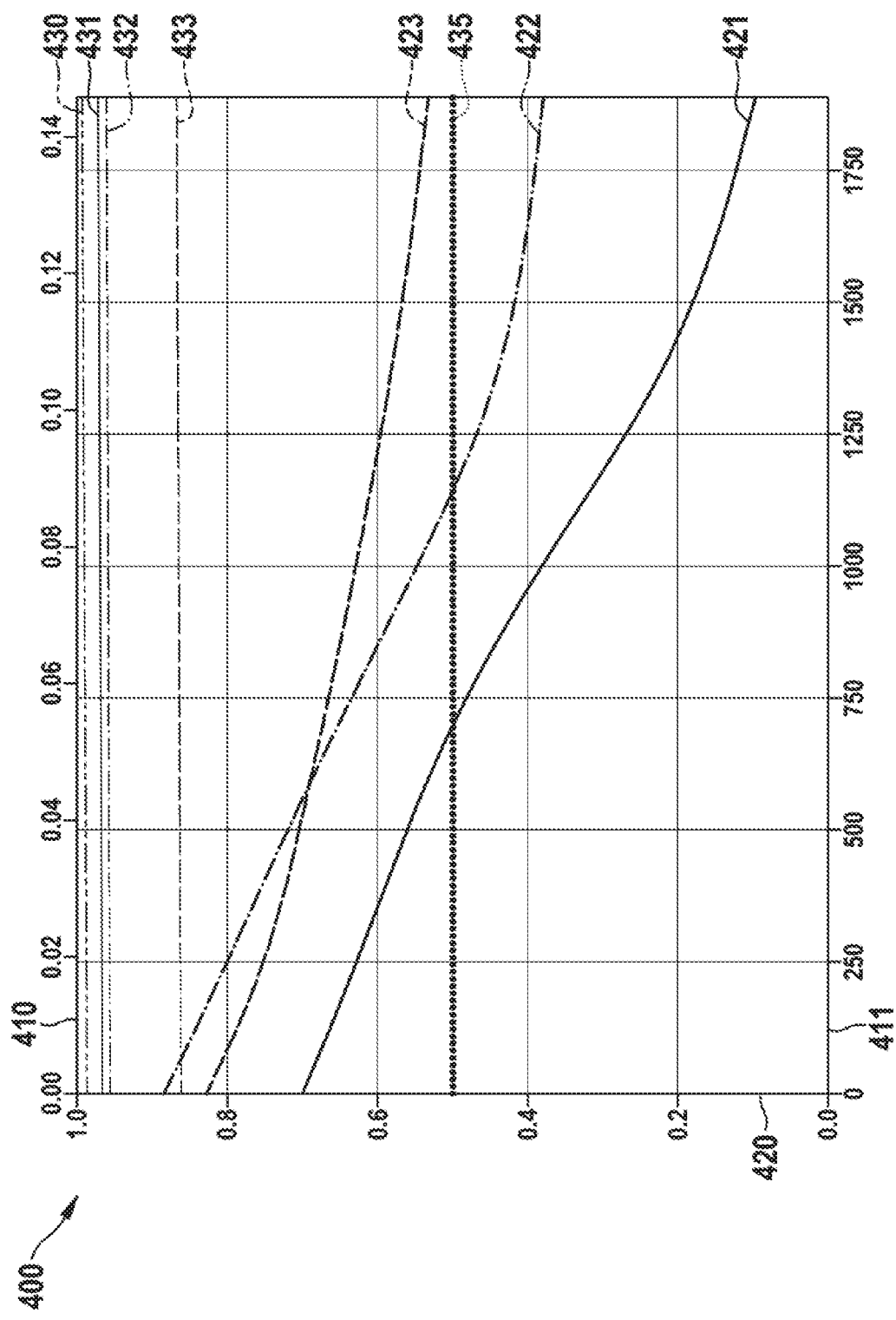
FIG. 4 shows certified accuracy for adversarial label flips as q is varied in accordance with the present invention FIG. 5 schematically shows an example of an embodiment of a method to classify sensor data with improved robustness against label noise in accordance with the present invention.

FIG. 4 shows graph 400 which plots certified accuracy for adversarial label flips as q is varied for the MNIST 1/7 test set. The noise level hyper-parameter q controls an accuracy/robustness tradeoff. The solid lines represent certified accuracy, except for the undefended classifier which represents an upper bound. The dashed lines are the overall non-robust accuracy of the classifier.

Show in FIG. 4 is a y-axis 420 which represents the certified accuracy. X-axis 411 shows the number of label flips. X-axis 410 shows the number of label flips as a fraction of the training set.

Line 421 represents certified accuracy for q=0.1 and regularization parameter λ=28241. There is a sharp decline in line 421, as it moves from 0 to 1 label flips. To make this visible, reference line 431 represents the same model with the same parameters is constant for the 0 label flip case. Note that certified accuracy declines sharply with just a single label flip, underlying the importance for robust predictions.

Lines 422 and 432 correspond to lines 421 and 431 but at q=0.2 and λ=30809.

Lines 423 and 433 correspond to lines 421 and 431 but at q=0.4 and λ=35944.

Line 435 is a reference line where g is constant. It has a constant certified accuracy of 0.5.

Line 430 is a reference line showing performance where the model is trained conventionally without robustness improvements. Note that it has best accuracy. Although not plotted, its accuracy quickly declines when the number of label flips increases.

Thus lines 431, 432 and 433 show the actual performance in an embodiment of the method with q=0.1, 0.2, 0.4 at zero label flips. As expected the (q=0.1)-line is above the (q=0.2)-line, which is above the (q=0.4)-line. Interestingly, even after one flip, the q=0.4 performance is better than the q=0.1 case, and continues that way.

The MNIST 1/7 dataset consists of just the classes 1 and 7, totaling 13007 training points and 2163 test points. A convolutional neural network was trained on the other eight MNIST digits to learn a 50-dimensional feature embedding, and then calculated Chernoff bounds for $G(\mu,\phi)$ as described above. In this example, the encoder has not previously seen examples of 1s and 7s but learned features from other digits. This approach eliminates the possibility that corrupted 1/7 training points can corrupt the encoder.

The certified accuracy on the test set is shown in FIG. 4 for varying probabilities q. As in prior work on randomized smoothing, the noise parameter q balances a trade-off between robustness and accuracy. As q increases, the required margin $|G(\mu,\phi)-\frac{1}{2}|$ to certify a given number of flips decreases. On the other hand, this results in more noisy training labels, which reduces the margin. The plots indicate the certified test set accuracy, and the non-robust accuracy of each classifier. Line 435 represents the performance of a constant classifier, assuming equal representation of the classes, and serves as a reference.

Further experiments found that an unregularized solution achieves almost 100% non-robust accuracy, but achieves lower robustness.

A similar experiment was performed on the dogfish test case. In this binary classification test, ImageNet images are selected that are labeled as a dog or a fish. In this case, the encoder was a ResNet-50 trained on the standard ImageNet training set but removed all images labeled as any kind of dog or fish.

Although the notation and algorithms are slightly more complex, all the embodiment discussed above can be extended to the multi-class setting. In this case, one may consider a class label ye 1, . . . ,K, and seek some smoothed prediction such that the classifier's prediction on a new point will not change with some number r flips of the labels in the training set.

For example, one may consider a classifier $\phi: \mathcal{X} \to [K]$, outputting the index of one of K classes. Under this formulation, for a given class $c \in [K]$, we may define $$G(\mu,\phi,c)=E_{x \sim \mu}[\phi_c(x)]=\int_x \mu(x)\phi_c(x)dx, \quad (21)$$

where $\phi_c(x)=1\{\phi(x)=c\}$ is the indicator function for if $\phi(x)$ outputs the class c. In this case, the hard threshold g may be evaluated by returning the class with the highest probability. That is, $$g(\mu,\phi)=\arg \max_c G(\mu,\phi,c). \quad (22)$$

Also in this case, the model can be partially linearized as in the binary case, which forgoes the need to actually perform random sampling at all, but instead directly bounds the randomized classifier using the Chernoff bound. Adopting the same notation, the equivalent least-squares classifier for the multi-class setting may find some set of weights $$\hat{\beta}=(X^TX)^{-1}X^TY \quad (23)$$

where $mY \in \{0,1\}^{n \times K}$ is a binary with each row equal to a one-hot encoding of the class label. Note that the resulting $\hat{\beta} \in \mathbb{R}^{n \times K}$ is now a matrix, and we let $\hat{\beta}_i$ refer to the i-th row. At prediction time, the predicted class of some new point $x_{n+1}$ may be given by the prediction with the highest value, e.g., $$\hat{y}_{n+1}=\arg \max_i \hat{\beta}_i^T h(x_{n+1}). \quad (24)$$

Alternatively, following the same logic as in the binary case, this same prediction may be written in terms of the α variable as $$\hat{y}_{n+1}=\arg \max_i \alpha^T Y_i \quad (25)$$

where $Y_i$ denotes the ith column of $Y_i$.

In a randomized smoothing setting, one may flip the class of any label with probability q, selecting an alternative label uniformly at random from the remaining K−1 labels. Assuming that predicted class label is i, we may to bound the probability that $$P(\alpha^T Y_i < \alpha^T Y_{i'}) \quad (26)$$

for all alternative classes 'i. By the Chernoff bound, we have that $$\log P(\alpha^T Y_i \le \alpha^T Y_{i'}) = \log p(\alpha^T(Y_i - Y_{i'}) \le 0) \quad (27)$$

-continued $$\le \min_{t\ge 0}\left\{\sum_{j=1}^{n}\log E\left[e^{-t\alpha_j(Y_{ji}-Y_{ji'})}\right]\right\}.$$

The random variable $Y_{ji}-Y_{ji'}$, takes on three different distribution depending if $y_j=i$, $y_j=i'$, or $y_j\ne i$ and $y_j\ne i'$. Specifically, this variable can take on the terms $+1, 0, -1$ with the associated probabilities $$P(Y_{ji}-Y_{ji'}=+1)=\begin{cases}1-q & \text{if } y_j=i\\ q/(K-1) & \text{otherwise}\end{cases} \quad (28)$$

$$P(Y_{ji}-Y_{ji'}=-1)=\begin{cases}1-q & \text{if } y_j=i'\\ q/(K-1) & \text{otherwise}\end{cases}$$

$$P(Y_{ji}-Y_{ji'}=0)=\begin{cases}q(K-2)/(K-1) & \text{if } y_j=i \text{ or } y_j=i'\\ 1-2q/(K-1) & \text{otherwise}\end{cases}$$

Combining these cases directly into the Chernoff bound gives $$\log P(\alpha^T Y_i < \alpha^T Y_{i'}) = \le \min_{t\ge 0}\left\{\sum_{j:y_j=i}\log\left((1-q)e^{-t\alpha_j}+q\frac{K-2}{K-1}+\frac{q}{K-1}e^{t\alpha_j}\right)+\right. \quad (29)$$

$$\sum_{j:y_j=i'}\log\left(\frac{q}{K-1}e^{-t\alpha_j}+q\frac{K-2}{K-1}+(1-q)e^{t\alpha_j}\right)+\sum_{j:y_j\ne i, y_j\ne i'}\log\left(\frac{q}{K-1}e^{-t\alpha_j}+1-2\frac{q}{K-1}+\frac{q}{K-1}e^{t\alpha_j}\right)\right\}.$$

Again, this problem is convex in t, and so can be solved efficiently using, e.g., Newton's method. And again since the reverse case can be computed via the same expression we can similarly optimize this in an unconstrained fashion.

Specifically, we can do this for every pair of classes i and i', and return the i which gives the smallest lower bound for the worst-case choice of i'.

To compute actual certification radii, below the KL divergence bound is derived for the case of K classes. Let $\mu, \rho$ and $\mu_i, \rho_i$ be defined as above, except that when a label is flipped with probability q it is changed to one of the other K-1 classes uniformly at random. Further, let $Y_1^i$ be the $i^{th}$ element of $Y_1$, meaning it is the "original" class which may or may not be flipped when sampling from $\mu$. First noting that each dimension of the distributions $\mu$ and $\rho$ are independent, one has $$KL\rho\mu = \sum_{i=1}^{n}KL\rho_i\mu_i = \sum_{i:\rho_i\ne\mu_i}KL\rho_i\mu_i =$$

$$r\left(\sum_{j=1}^{K}\rho_i(j)\log\left(\frac{\rho_i(j)}{\mu_i(j)}\right)\right)=r\left(\rho_i(y_1^i)\log\left(\frac{\rho_i(y_1^i)}{\mu_i(y_1^i)}\right)+\rho_i(y_2^i)\log\left(\frac{\rho_i(y_2^i)}{\mu_i(y_2^i)}\right)\right)=$$

$$r\left((1-q)\log\left(\frac{1-q}{\frac{q}{K-1}}\right)+\frac{q}{K-1}\log\left(\frac{\frac{q}{K-1}}{1-q}\right)\right)=$$

$$r\left(1-\frac{Kq}{K-1}\right)\log\left(\frac{(1-q)(K-1)}{q}\right)$$

Plugging in the robustness guarantee (6), one obtained that $g(\mu,\phi)=g(\rho,\phi)$ so long as $$r\le\frac{\log(4p(1-p))}{2\left(1-\frac{Kq}{K-1}\right)\log\left(\frac{q}{(1-q)(K-1)}\right)}. \quad (30)$$

Setting K=2 recovers the divergence term (7) and the bound (8).

Figure 5:
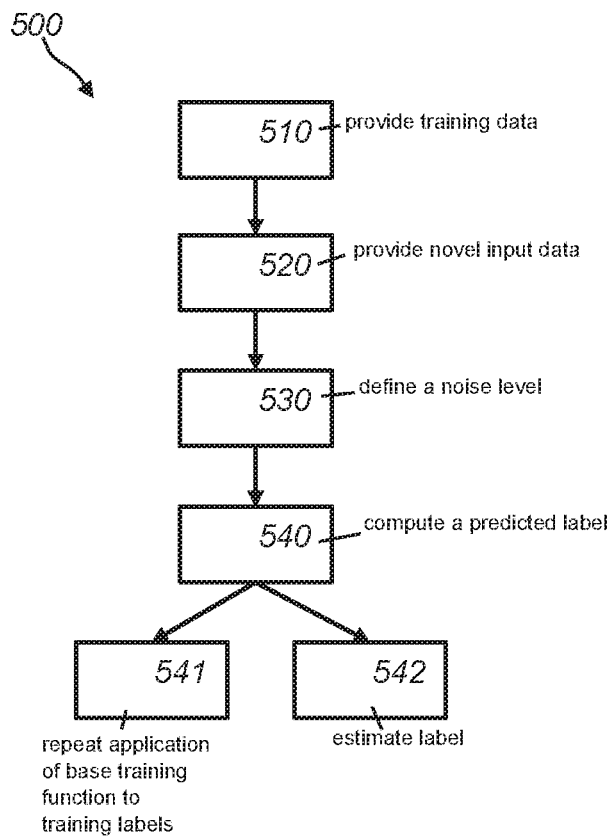

FIG. 5 schematically shows an example of an embodiment of a method 500 to classify sensor data with improved robustness against label noise. Method 500 may be computer implemented and comprises
 providing (510) training data ($\{(x_i,y_i)\in\mathbb{R}^d\times\{0,1\}\}_{i=1}^{n}$), the training data comprising multiple training input data ($x_i$) and corresponding labels ($y_i$), a training input data representing physical properties of a physical system obtained from one or more sensors, a base classifier being defined for the training data, the base classifier comprising an encoder (h) and a classifier ($\beta$), the encoder being configured to map an input data ($x_i$) to a latent representation ($h(x_i)$), the classifier being configured to be applied to the latent representation wherein the encoder is defined by parameters that are pre-trained, a base training function is configured for optimizing parameters defining the classifier according to the training data,
 providing (520) a novel input data ($x_{n+1}$)
 defining (530) a noise level (q) for the multiple labels,
 computing (540) a predicted label for the novel input with improved robustness against label noise comprising estimating a label which is most likely under repeated application of the base training function to the training labels incorporating noise according to the noise level and subsequent application of a base classifier configured according to the base prediction function to the novel input.

Computing the predicted label may be done in at least two ways. For example, a method may comprise
 repeated application (541) of the base training function to the training labels incorporating noise according to the noise level and subsequent application of a base classifier configured according to the base prediction function to the novel input.

On the other hand, the predicted label may also be computed by
 estimating a label which is most likely under the repeated application comprises evaluating (542) one or more inequalities to obtain bounds for said likelihood.

The encoder may comprise a neural network. Possibly, the classifier part of the base classifier may also comprise a neural network. In a typical embodiment though, the encoder comprises a neural network, whereas the classifier part does not, or at best a shallow one, e.g., a single sigmoid, or a single layer. The neural network, e.g., the encoder neural network may be trained with a machine learning method.

For example, accessing training data, and/or receiving input data may be done using a communication interface, e.g., an electronic interface, a network interface, a memory interface, etc. For example, storing or retrieving parameters may be done from an electronic storage, e.g., a memory, a hard drive, etc., e.g., parameters of the networks. For example, applying a neural network to data of the training data, and/or adjusting the stored parameters to train the network may be done using an electronic computing device, e.g., a computer. The encoder can also output mean and/or variance, instead of directly the output. In case of mean and variance to obtain the output one may sample from this defined Gaussian.

The encoder neural network may have multiple layers, which may include, e.g., convolutional layers and the like. For example, the neural network may have at least 2, 5, 10, 15, 20 or 40 hidden layers, or more, etc. The number of neurons in the neural network may, e.g., be at least 10, 100, 1000, 10000, 100000, 1000000, or more, etc.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method according to the present invention may be executed using software, which comprises instructions for causing a processor system to perform method 500, e.g., together with one or more of parts 541 and 542. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the present invention also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 7A:
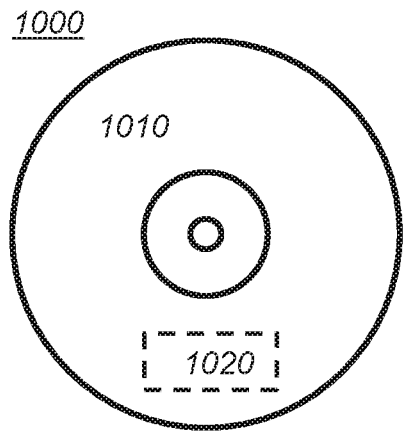
FIG. 7a schematically shows a computer readable medium having a writable part comprising a computer program according to an embodiment of the present invention.

FIG. 7a shows a computer readable medium 1000 having a writable part 1010 comprising a computer program 1020, the computer program 1020 comprising instructions for causing a processor system to perform a classifying method according to an embodiment of the present invention. The computer program 1020 may be embodied on the computer readable medium 1000 as physical marks or by magnetization of the computer readable medium 1000. However, any other suitable embodiment is possible as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said classifying method.

Figure 7B:
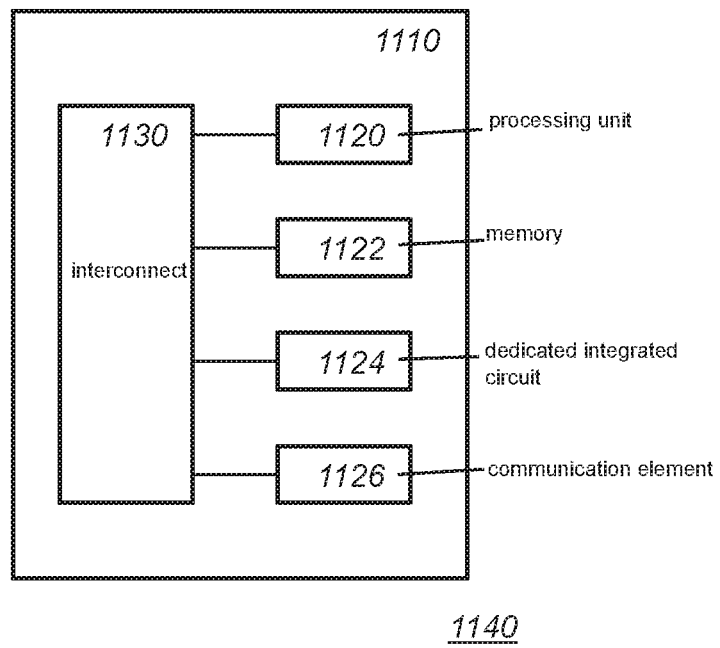
FIG. 7b schematically shows a representation of a processor system according to an embodiment of the present invention.

FIG. 7b shows in a schematic representation of a processor system 1140 according to an embodiment of a classifying system in accordance with the present invention. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment of the present invention, processor system 1140, e.g., the classifying system may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

IAs used herein, the term "non-transitory" will be understood to exclude transitory signals but to include all forms of storage, including both volatile and non-volatile memories. While device 1140 is shown as including one of each described component, the various components may be duplicated in various embodiments. For example, the processor may include multiple microprocessors that are configured to independently execute the methods described herein or are configured to perform steps or subroutines of the methods described herein such that the multiple processors cooperate to achieve the functionality described herein. Further, where the device 1140 is implemented in a cloud computing system, the various hardware components may belong to separate physical systems. For example, the processor may include a first processor in a first server and a second processor in a second server.

It should be noted that the above-mentioned embodiments illustrate rather than limit the presently disclosed subject matter, and that those skilled in the art will be able to design many alternative embodiments in view of the description herein.

Use of the verb 'comprise' and its conjugations does not exclude the presence of elements or steps other than those stated. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. Example embodiment of the present invention may be implemented by hardware comprising several distinct elements, and by a suitably programmed computer. For an example device enumerated as several parts, several of these parts may be embodied by one and the same item of hardware. The mere fact that certain measures are described separately does not indicate that a combination of these measures cannot be used to advantage.

What is claimed is:

1. A computer implemented method for classifying sensor data with improved robustness against label noise, the method comprising the following steps:
providing training data, the training data including multiple training input data and corresponding training labels, the training input data representing physical properties of a physical system obtained from one or more sensors;
defining a base classifier for the training data, the base classifier including an encoder and a classifier, the encoder being configured to map an input data to a latent representation, the classifier being configured to be applied to the latent representation wherein the encoder is defined by parameters that are pre-trained, a base training function is configured for optimizing parameters defining the classifier according to the training data;
providing a novel input data;
defining a noise level for the training labels;
computing a predicted label for the novel input with improved robustness against label noise by estimating a label which is most likely under repeated application of the base training function to the training labels incorporating noise according to the noise level and subsequent application of the base classifier, configured according to a base prediction function, to the novel input;
computing a radius indicating a number of label changes for which the predicted label for the novel input will not change if a number of label changes does not exceed the indicated number of label changes;
obtaining an estimate of a number of corrupted labels in the training data; and
comparing the estimated number of corrupted labels with the radius before accepting the predicted label for the novel input.

2. The method as in claim 1, wherein the classifier includes a linear operation configured to be applied to a latent representation.

3. The method as in claim 2, wherein the base training function is configured for applying a least-squares optimization to derive parameters defining the linear operation according to the training data.

4. The method as in claim 1, further comprising:
computing a linear operation to obtain a combined result of the application of the base training function and the base prediction function for the novel input, and the training labels incorporating noise.

5. The method as in claim 1, wherein the estimating of the label which is most likely under the repeated application includes evaluating one or more inequalities to obtain bounds for the likelihood.

6. The method as in claim 5, wherein inequalities are defined for multiple values of a variable, and wherein the method further comprises approximating a value for the variable for which the inequalities is tightest, the approximating including a Newton approximation.

7. The method as in claim 1, wherein:
the encoder includes a neural network, and/or
the encoder is a feature extractor, configured to generate multiple features, and/or
the encoder is trained as an autoencoder, and/or
the encoder is trained on a selected subset of the provided training data, and/or
the encoder is trained on the training data together with a temporary classifier.

8. The method as recited in claim 1, wherein:
the encoder and the classifier are defined by parameters, a number of parameters defining the encoder being larger than the number of parameters defining the classifier, and/or
the encoder and the classifier each include a neural network, the neural network of the encoder having more nodes and/or more layers than the neural network of the classifier, and/or
the classifier includes a linear operation and a sigmoid operation.

9. The method as recited in claim 1, further comprising:
repeatedly applying the base training function to the training labels incorporating noise according to the noise level and subsequently applying the base classifier, configured according to the base prediction function, to the novel input.

10. The method as in claim 1, further comprising:
training the encoder depending on the radius and the estimated number of corrupted labels.

11. The method as in claim 10, further comprising
if an estimated number of corrupted labels is higher than the radius, obtaining corrected labels and/or discarding corrupted labels from the training data, and training the encoder on the corrected labels and/or on the training data without the discarded labels.

12. The method as in claim 1, wherein a respective predicted label is computed for one or more novel input data, and the method further comprising:
storing one or more novel input data and each respective predicted label; and
if an estimate of a number of corrupted labels in the stored predicted labels is below the radius, training the encoder on the stored one or more novel input data and the predicted labels.

13. The method as in claim 1, wherein each of the training input data is associated with one or more binary labels in the training data.

14. The method as in claim 1, further comprising:
determining, based on the predicted label, a control signal for the physical system and/or for an autonomous device operating in the physical system.

15. A classifying system configured to classify sensor data with improved robustness against label noise, the system comprising:
- a training data storage device configured to store training data, the training data including multiple training input data and corresponding labels, the training input data representing physical properties of a physical system obtained from one or more sensors;
- a base classifier defined for the training data, the base classifier including an encoder and a classifier, the encoder being configured to map an input data to a latent representation, the classifier being configured to be applied to the latent representation wherein the encoder is defined by parameters that are pre-trained, a base training function is configured for optimizing parameters defining the classifier according to the training data;
- a novel input data interface configured to obtain a novel input data; and
- a processor system configured to:
  - define a noise level for the training labels,
  - compute a predicted label for the novel input data with improved robustness against label noise the computing including estimating a label which is most likely under repeated application of the base training function to the training labels incorporating noise according to the noise level and subsequent application of the base classifier configured, according to a base prediction function, to the novel input
  - compute a radius indicating a number of label changes for which the predicted label for the novel input will not change if a number of label changes does not exceed the indicated number of label changes,
  - obtain an estimate of a number of corrupted labels in the training data, and
  - compare the estimated number of corrupted labels with the radius before accepting the predicted label for the novel input.

16. A non-transitory computer readable medium on which is stored data representing instructions for classifying sensor data with improved robustness against label noise, the instructions, when executed by a computer system, causing the computer system to perform the following steps:
- providing training data, the training data including multiple training input data and corresponding training labels, the training input data representing physical properties of a physical system obtained from one or more sensors;
- defining a base classifier for the training data, the base classifier including an encoder and a classifier, the encoder being configured to map an input data to a latent representation, the classifier being configured to be applied to the latent representation wherein the encoder is defined by parameters that are pre-trained, a base training function is configured for optimizing parameters defining the classifier according to the training data;
- providing a novel input data;
- defining a noise level for the training labels;
- computing a predicted label for the novel input with improved robustness against label noise by estimating a label which is most likely under repeated application of the base training function to the training labels incorporating noise according to the noise level and subsequent application of the base classifier, configured according to a base prediction function, to the novel input;
- computing a radius indicating a number of label changes for which the predicted label for the novel input will not change if a number of label changes does not exceed the indicated number of label changes;
- obtaining an estimate of a number of corrupted labels in the training data; and
- comparing the estimated number of corrupted labels with the radius before accepting the predicted label for the novel input.

* * * * *